(12) United States Patent
Sedlacek

(10) Patent No.: US 7,011,880 B2
(45) Date of Patent: Mar. 14, 2006

(54) BELT AND METHOD OF MARKING

(75) Inventor: Douglas R. Sedlacek, Englewood, CO (US)

(73) Assignee: The Gates Corporation, Denver, CO (US)

( * ) Notice: Subject to any disclaimer, the term of this patent is extended or adjusted under 35 U.S.C. 154(b) by 119 days.

(21) Appl. No.: 10/601,263

(22) Filed: Jun. 20, 2003

(65) Prior Publication Data
US 2004/0005439 A1 Jan. 8, 2004

Related U.S. Application Data

(60) Provisional application No. 60/393,800, filed on Jul. 3, 2002.

(51) Int. Cl.
B32B 3/10 (2006.01)
F16G 1/00 (2006.01)

(52) U.S. Cl. ................. 428/138; 428/187; 474/264; 474/268

(58) Field of Classification Search .............. 428/42.1, 428/174, 187, 172, 494, 495, 138; 474/264, 474/268
See application file for complete search history.

(56) References Cited

U.S. PATENT DOCUMENTS

| 4,289,559 A | 9/1981 | Murphy ..................... 156/238 |
| 4,355,967 A | 10/1982 | Hellmer ..................... 425/503 |
| 4,401,992 A | 8/1983 | Vorst et al. ............... 346/76 L |
| 4,767,481 A | 8/1988 | Bryant et al. ............... 156/116 |
| 4,902,554 A | 2/1990 | Lang .......................... 428/195 |
| 4,979,591 A | 12/1990 | Habegger et al. ............. 186/68 |
| 5,047,110 A | 9/1991 | Bryant et al. ............... 156/540 |
| 5,244,080 A * | 9/1993 | Bierbaum ................. 198/502.1 |
| 5,260,542 A | 11/1993 | Ishiguro et al. .......... 219/121.68 |
| 5,262,612 A | 11/1993 | Momany et al. .......... 219/121.67 |
| 5,373,039 A | 12/1994 | Sakai et al. ................. 524/100 |
| 5,428,857 A | 7/1995 | Murray ......................... 15/217 |
| 5,474,627 A | 12/1995 | Carriere et al. ................ 156/47 |
| 5,560,845 A | 10/1996 | Birmingham, Jr. et al. ..................... 219/121.85 |
| 5,587,094 A | 12/1996 | Yoshida et al. .......... 219/121.68 |
| 5,605,641 A | 2/1997 | Chiba et al. ............ 219/121.68 |

(Continued)

FOREIGN PATENT DOCUMENTS

WO   WO 00/58191   * 10/2000

OTHER PUBLICATIONS

Grant and Hack's Chemical Dictionary, 5th edition, 1987, pp. 455 and 586.*

Primary Examiner—Donald J. Loney
(74) Attorney, Agent, or Firm—J. A. Thurnau, Esq.; C. H. Castleman, Esq.; P. N. Dunlap

(57) ABSTRACT

A belt and method of marking a belt. A layer of polyethylene material is joined or cured to a belt. The layer is optically distinguishable from a belt body. The layer is etched to expose a portion of the belt body in order to contrast the layer with the belt body. A second layer of polyethylene material may be applied adjacent to the first layer. The second layer is optically distinguishable from the first layer. The first or second layer is etched using cutting, grinding or laser light in order to expose portions of the adjacent layer, or of the belt body, thus providing a method of permanently marking the belt.

8 Claims, 1 Drawing Sheet

U.S. PATENT DOCUMENTS

| | | |
|---|---|---|
| 5,653,900 A | 8/1997 | Clement et al. ....... 219/121.68 |
| 5,714,024 A * | 2/1998 | Tomiyama et al. ......... 156/137 |
| 5,733,615 A | 3/1998 | Rackovan et al. ......... 428/35.7 |
| 5,734,412 A | 3/1998 | Hasebe et al. .............. 347/247 |
| 5,760,120 A | 6/1998 | Itoh et al. ................... 524/431 |
| 6,080,465 A | 6/2000 | Boissonnet et al. ......... 428/139 |

* cited by examiner

BELT AND METHOD OF MARKING

REFERENCE TO RELATED APPLICATIONS

This application claims priority from U.S. provisional application No. 60/393,800 filed Jul. 3, 2002.

FIELD OF THE INVENTION

The invention relates to a belt and method of marking a belt and more particularly, to a belt and method of marking a belt using at least one optically distinguishable polyethylene layer.

BACKGROUND OF THE INVENTION

Belts may be manufactured with or without marking indicia. Marking indicia may comprise labels, text or other material impressed or printed directly on the belt or a combination of the foregoing.

More particularly, the prior art teaches use of a non-vulcanized colored rubber which is adhered to a base material. During vulcanization the colored rubber is imprinted upon the underlying material. This often results in distorted markings or undesirable surface features, such as dips of bumps. Such dips or bumps can cause noise during operation of the belt. It is also known that a laser may be used to apply a mark to a belt by burning or etching a mark in a product surface.

Representative of the art is Japanese Patent No. 3126937 which discloses a method for marking a belt.

What is needed is a belt and a method of marking a belt using a polyethylene layer that is optically distinguishable from a belt body. What is needed is a belt and a method of marking a belt using an optically distinguishable polyethylene layer etched by a laser light. The present invention meets these needs.

SUMMARY OF THE INVENTION

The primary aspect of the present invention is to provide a belt and a method of marking a belt using a polyethylene layer that is optically distinguishable from a belt body.

Another aspect of the invention is to provide a belt and a method of marking a belt using an optically distinguishable polyethylene layer etched by laser light.

Other aspects of the invention will be pointed out or made apparent by the following description of the invention and the accompanying drawings.

The invention comprises a belt and method of marking a belt. A layer of polyethylene material is joined or cured to a belt. The layer is optically distinguishable from a belt body. The layer is etched to expose a portion of the belt body in order to contrast the layer with the belt body. A second layer of polyethylene material may be applied adjacent to the first layer. The second layer is optically distinguishable from the first layer. The first or second layer is etched using cutting, grinding or laser light in order to expose portions of the adjacent layer, or of the belt body, thus providing a method of permanently marking the belt.

DETAILED DESCRIPTION OF THE INVENTION

Figure 1:
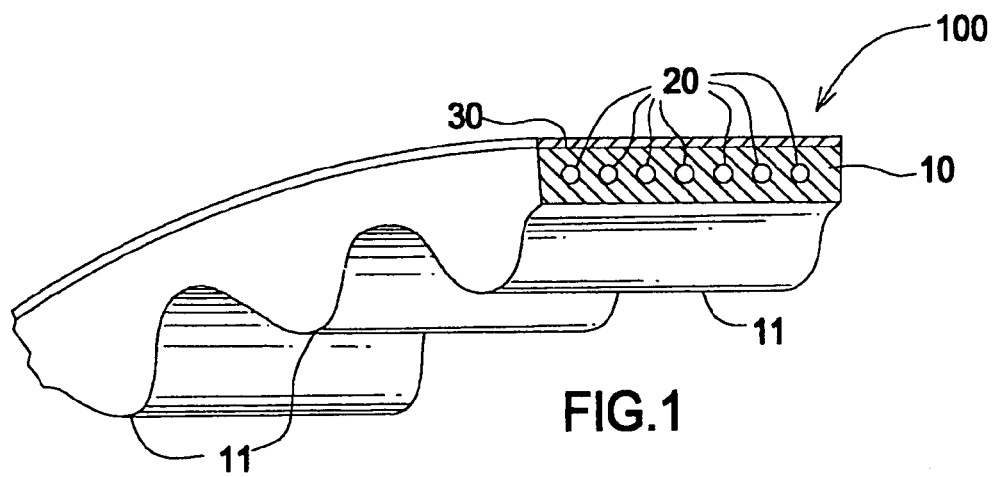
FIG. 1 is a cross sectional perspective view of a belt having an optically distinguishable polyethylene layer.

FIG. 1 is a cross sectional perspective view of a belt having an optically distinguishable polyethylene (PE) layer. The illustrative product comprises a power transmission belt 100 used, for example, in an automotive or industrial application.

Belt 100 comprises an elastomeric body 10 with tensile members 20 embedded therein. The tensile members 20 extend parallel to a longitudinal axis. Tensile members 20 may comprise any material known in the belt art, including polyester, nylon, aramid and their equivalents. Tensile members 20 extend longitudinally within the body 10.

A profile comprising transverse teeth or cogs 11 extend transverse to and along a longitudinal surface of the belt body 10. The profile may also comprise a multi-ribbed surface, see FIG. 3.

Layer 30 comprises a thermoplastic material. Thermoplastic layer 30 is joined to body 10 by use of any suitable cure, chemical adhesive or molding process known in the art. Although the preferred embodiment uses a peroxide cure process, thermoplastic layer 30 may also be joined to body 10 using chemical adhesives known in the art and by molding.

Body 10 may comprise thermoset elastomeric material such as hydrogenated nitrile butadiene rubber (HNBR), ethylene-propylene (diene) rubber (EPDM), styrene-butadiene rubber (SBR), chloroprene rubber (CR), natural rubber (NR), nitrile rubber (NBR), butyl rubber (BR) or any other elastomeric materials used in power transmission belts.

Layer 30 is selected with beneficial characteristics to create an optical appearance or contrast that is distinguishable from a belt body 10 or adjacent layer. Optical as used herein refers to visual and non-visual electromagnetic (EM) radiation. Layer 30 has a thickness in the range of approximately 3.5 mils to 30 mils.

The characteristics of the layer may include a particular color, texture, or reflectivity that optically distinguishes layer 30 from belt body 10. The difference in appearance, or contrast, results from differences in reflected electromagnetic (EM) radiation so that the layer 30 can be distinguished from belt body 10 by a person's eye (visually), with an optical scanner such as a bar code reader, or by any other scanner or means of detecting visual or non-visual EM radiation. Layer 30 may also comprise any visually detectable color or combination of colors. In the instant embodiment layer 30 comprises polyethylene (PE) having a particular distinguishing characteristic, that is, color, preferable other that black. By way of example and not of limitation, layer 30 may also substantially comprise polypropylene, polyester, polyamide, polyvinylidene chloride, polyvinyl chloride and any equivalents or combinations thereof. Each of the foregoing being optically distinguishable. In the case of polyethylene, layer 30 is compatible with and co-curable with ethylene propylene rubbers via peroxide cure.

Use of polyethylene has the advantage of avoiding the need for a separate rubber mixing step as is the case with prior art colored rubber stocks. The PE sheet material has additional advantages including availability in a wide range of thicknesses, relatively low cost compared to mixing rubber stocks, ease of storage and processing, and it is readily recyclable.

Figure 2:
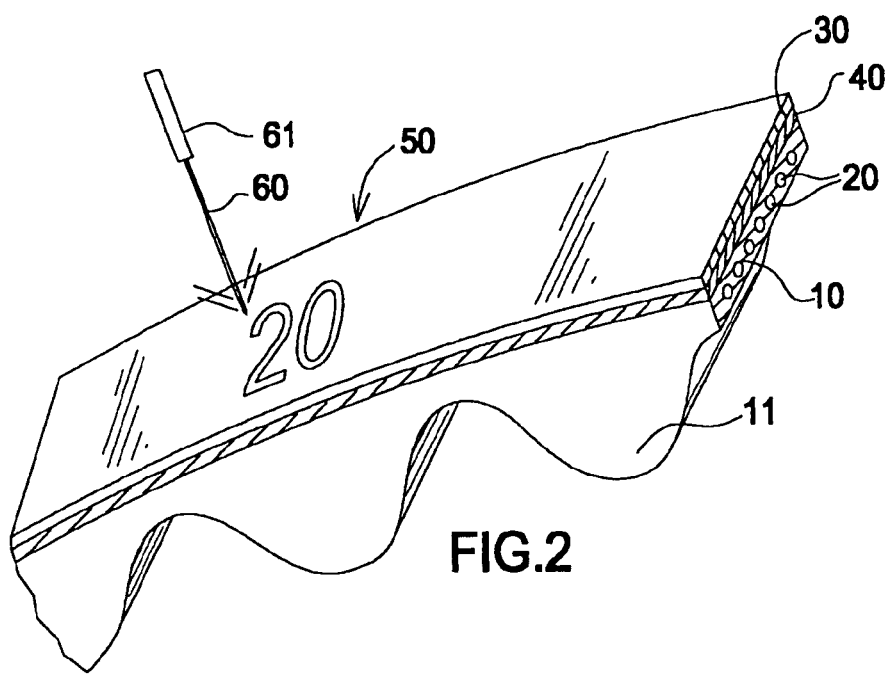
FIG. 2 is a perspective view of a belt having an optically distinguishable layer etched by laser light.

FIG. 2 is a perspective view of a belt having an optically distinguishable layer etched by laser light. In this embodiment layer 40 is molded, joined or cured to the belt body 10 under layer 30. Layer 40 has a thickness in the range of approximately 3.5 mils to 30 mils.

Once the belt is cured or molded, a laser light 60 from a laser light source 61 is focused upon a selected portion of layer 30. The intensity and position of the laser light source 61, and thereby the laser light 60, is adjusted and moved in order to remove selected portions of layer 30 without damaging underlying layer 40, thereby exposing a portion of layer 40. The intensity of the laser light 60 may be adjusted in order to penetrate any thickness of layer 30. Since layer 30 is optically distinguishable from layer 40, the removed portions of layer 30 expose layer 40, which then comprise a detectable mark on the belt. As an example, mark 50 depicts the number "20". Of course, any symbol, text, or other desired pattern can be etched into layer 30 to serve as a mark on the belt or product.

Layer 30 may also be etched to mark a belt in the absence of layer 40. In this embodiment, belt body 10 provides a particular optical appearance and contrast to distinguish it compared to layer 30. The optical appearance of layer 30 is properly selected to distinguish it from the optical appearance of belt body 10.

In another embodiment, prior to cure layer 30 has selected portions removed, for example by etching, cutting or grinding prior to assembling and curing the belt. Cuts in layer 30 depict the same mark as described in FIG. 2, only the cuts used to make mark 50 are not performed using laser light. They may be ground or die cut into layer 30 using tools known in the art. The layer would then be cured or molded with the product as otherwise described herein, rendering a permanent marking of the belt or product.

In yet another embodiment a plurality of optically distinguishable layers are 'stacked' or layered together on a belt. Each layer has an appearance which contrasts with or distinguishes it from each of the other layers. A laser light is then selectively operated at different intensities and positions in order to remove selective portions of overlying layers to expose different portions of particular underlying layers. In this manner a variable appearance is etched into the belt or other product. This may include different colors and layers being exposed to indicate different information about the belt, for example, part or inventory numbers. It may also be used to create a visually appealing effect on a belt or product using different colors and patterns. Although FIG. 2 depicts two layers as an example and not as a limitation, any number of layers may be stacked to achieve the described effect.

In yet another embodiment a plurality of optically distinguishable layers are 'stacked' or layered together on a product as described previously. Each layer has a different appearance to distinguish it from each of the other layers. In this embodiment a knife, grinder, cutting tool, or die cutter is used to remove portions of overlying or underlying layers to selectively expose different portions of particular layers. In this manner a variable appearance may be realized on the belt or product. As described herein, this may include different colors and layers being exposed to illustrate different information about the belt or product. It may also be used to create a visually appealing effect on a belt or product using different colors. Although FIG. 2 depicts two layers as an example, any number of layers may be stacked to achieve the described effect.

In yet another embodiment, separate regions having different colors may be formed in each layer 30 and layer 40. The different color regions in each layer may be disposed laterally adjacent to each other across a surface of layer 30 or layer 40. They may also have any form as may be required to achieve a desired visual effect.

Figure 3:
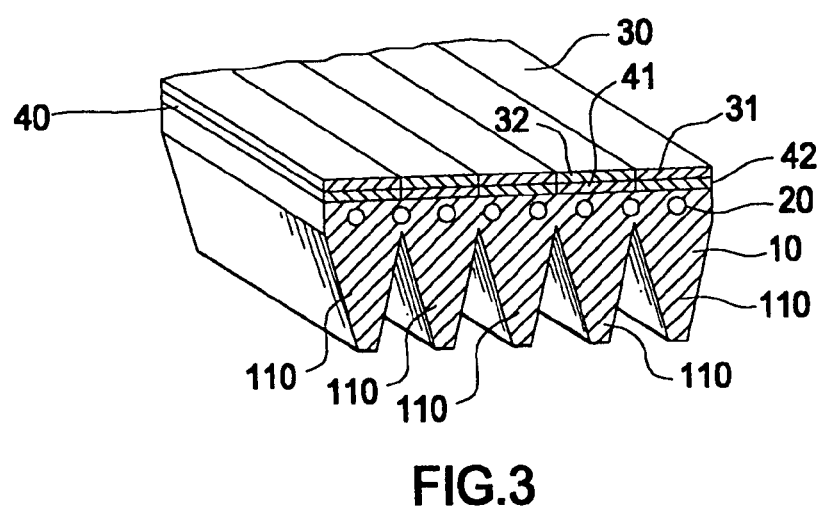
FIG. 3 is a cross-sectional view of a multi-ribbed profile.

For example, referring to FIG. 3, regions 31, 42 may be blue, while regions 32, 41 may be green and so on, each region being adjacent to each other and disposed parallel to a belt length. Each region being optically distinguishable from all other adjacent regions both vertically and laterally. Each region is then etched in order to expose differing portions of each adjacent region. This affords yet another means of making unique markings on a belt or product.

FIG. 3 is a cross-sectional view of a multi-ribbed profile. A profile comprising ribs 110 extend along a longitudinal axis of a belt. Regions 31, 32, 41, 42 of layer 30 and layer 40 each have having differing optical appearances are depicted.

Although forms of the invention have been described herein, it will be obvious to those skilled in the art that other variations may be made in the construction and relation of parts without departing from the spirit and scope of the invention described herein.

I claim:

1. A belt comprising:
    an elastomeric body;
    a tensile member extending along the belt in a longitudinal direction;
    a first thermoplastic layer applied to the elastomeric body;
    the first thermoplastic layer having an opening whereby a portion of the elastomeric body contrasts with the first thermoplastic layer;
    the first thermoplastic layer being optically distinguishable from the elastomeric body;
    a second thermoplastic layer adjacent to the first thermoplastic layer; and
    the second thermoplastic layer having an opening whereby a portion of the second thermoplastic layer contrasts with the first thermoplastic layer.

2. The belt as in claim 1, wherein the opening comprises a pattern.

3. The belt as in claim 1, wherein the first thermoplastic layer is selected from polyethylene, polypropylene, polyester, polyamide, polyvinylidene chloride, polyvinyl chloride or a combination of any two or more of the foregoing.

4. The belt as in claim 1 further comprising transverse teeth on the elastomeric body.

5. The belt as in claim 1, wherein the second thermoplastic layer is selected from polyethylene, polypropylene, polyester, polyamide, polyvinylidene chloride, polyvinyl chloride or a combination of any two or more of the foregoing.

6. The belt as in claim 3 wherein the first thermoplastic material has a color different from an elastomeric body color.

7. The belt as in claim 5, wherein the second thermoplastic material has a color different from a first thermoplastic material color.

8. The belt as in claim 1, wherein the elastomeric body is selected from HNBR, EPDM, SBR, CR, NBR, NR or BR or a combination of any two or more of the foregoing.

* * * * *